W. Servant,
Sprinkler.
No. 107,633. Patented Sep. 20, 1870.
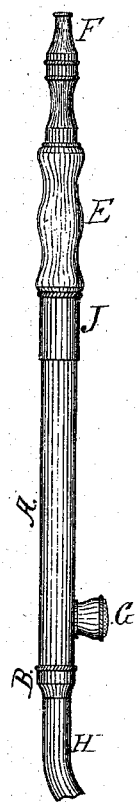
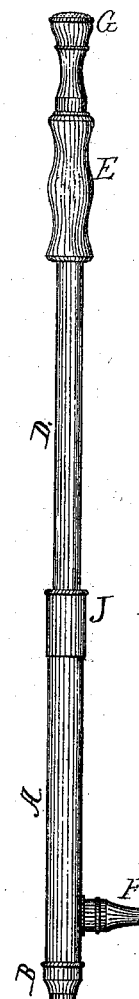
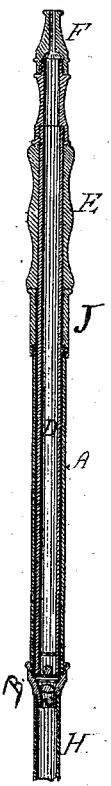
WITNESSES.
M. B. Vincent
John D. W. Taylor
INVENTOR.
Wm. Servant

UNITED STATES PATENT OFFICE.

WILLIAM SERVANT, OF PROVIDENCE, RHODE ISLAND, ASSIGNOR TO HIMSELF AND JOSIAH A. WHITMAN, OF SAME PLACE.

IMPROVEMENT IN PORTABLE SPRINKLING-PUMPS.

Specification forming part of Letters Patent No. 107,633, dated September 20, 1870.

*To all whom it may concern:*

Be it known that I, WILLIAM SERVANT, of the city and county of Providence, and State of Rhode Island, have invented a new and improved manufacture in the shape of a Portable Pump, which may be used for a great variety of purposes, such as the washing of windows and carriages, watering of plants and flowers, sprinkling of floors, &c.; and I do hereby declare that the following is a full and exact description thereof, reference being had to the accompanying drawing, which forms a portion of this specification—

Figure 1 being a side view of said pump in its compact condition; Fig. 2, a view of the same in its extended condition, or that to which it is drawn by the movement which fills the pump with water; and Fig. 3 is a section of said pump, showing the internal arrangement of the same.

Similar letters indicate like parts in the drawing.

My improved portable pump is made as light as possible consistent with stiffness and strength, and the shape and arrangement of the respective parts thereof are such that, when the induction-pipe H thereof is placed in a vessel of water, the operator, while filling the pump and discharging the contents therefrom, can hold the pump in any desired position, and, consequently, can discharge the water therefrom in a vertical, horizontal, or any desired oblique direction.

This is accomplished by means of a jointed, swiveled, flexible, or otherwise self-adjusting induction-pipe, H, combined with the valve-chamber B at the lower end of the pump-barrel A, acting in conjunction with a tubular-valved piston, D, located within the pump-barrel, and extending a sufficient distance beyond the upper end thereof to receive a handle, E, to be grasped by the hand of the operator, and also a sufficient distance farther to enable the discharging-nozzle F or the rose G to be screwed to the end of said hollow piston.

Any suitable valve may be located within the chamber B at the bottom of the pump-barrel A, and any suitable valve may be combined with the lower end of the tubular piston D; but in practice I have found that ball-valves give better satisfaction than any other form of valves in both of said positions.

At the extremity of the flexible induction-tube H, I secure a strainer-head, I, which head should be sufficiently heavy to retain the end of said tube within the vessel of water while the operator may be shifting the pump from one position to another while operating the same.

Projecting from its attachment to one side of the pump-barrel A is a short screw, for the safe-keeping of either the rose G or the nozzle F, when either of said articles may not be in use upon the outer end of the tubular piston D.

I do not intend to limit the aforedescribed arrangements to a single-acting pump, as they are equally applicable to a double-action pump.

What I claim as my invention, and desire to secure by Letters Patent, is—

1. My improved portable pump, having a hollow piston adapted to the delivery of water through its upper end, and having a jointed, swiveled, flexible, or otherwise self-adjusting induction-tube, so combined with the lower end thereof as to enable the pump, while being operated, to be held in any desired position, all substantially as herein described.

2. In combination with the subject-matter of the preceding clause of claim, the proportions of the hollow piston D, which enables the tubular handle E to be combined therewith and a delivery-nozzle or rose to be screwed to the upper end thereof, all as herein represented and described.

W. SERVANT.

Witnesses:
W. B. VINCENT,
JOHN D. W. TAYLOR.